United States Patent [19]

Eaton

[11] Patent Number: 5,567,109
[45] Date of Patent: Oct. 22, 1996

[54] SELF-LOADING TOBACCO TRAILER

[76] Inventor: Jay S. Eaton, Rte. 2, Buladean, Bakersville, N.C. 28705

[21] Appl. No.: 417,086

[22] Filed: Apr. 5, 1995

[51] Int. Cl.⁶ .................................................. B60P 1/00
[52] U.S. Cl. ...................... 414/679; 198/750.1; 198/681; 414/527; 414/745.1
[58] Field of Search .................................. 414/527, 528, 414/679, 26, 745.1, 746.7; 198/750.1, 750.2, 750.5, 681

[56] References Cited

U.S. PATENT DOCUMENTS

| | | | |
|---|---|---|---|
| 333,985 | 1/1886 | Wilson | 34/203 |
| 951,650 | 3/1910 | Miller | 131/304 |
| 1,712,650 | 5/1929 | Clark | 340/471 |
| 2,129,796 | 9/1938 | Swift | 414/527 |
| 2,551,368 | 5/1951 | Flinchbaugh | 414/527 |
| 2,670,094 | 2/1954 | Kizis | 414/608 |
| 2,732,844 | 1/1956 | Stark | 198/681 X |
| 2,777,446 | 1/1957 | Bogaty | 131/304 |
| 2,833,425 | 5/1958 | Lee | 414/26 |
| 2,904,193 | 9/1959 | Poythress | 414/26 |
| 3,036,413 | 5/1962 | Schulte | 414/745.7 X |
| 3,165,208 | 1/1965 | Lewis | 414/26 |
| 3,250,405 | 5/1966 | Rosser | 414/26 |
| 3,262,587 | 7/1966 | Anderson | 414/26 |
| 3,342,353 | 9/1967 | Davis | 414/345 |
| 3,357,576 | 12/1967 | Strombeck et al. | 414/528 X |
| 3,424,489 | 1/1969 | Hoy | 414/495 X |
| 3,542,226 | 11/1970 | Hutton, Jr. | 414/495 |
| 3,802,006 | 4/1974 | Nelson et al. | 414/495 X |
| 3,902,607 | 9/1975 | Middleton | 414/26 |
| 3,921,824 | 11/1975 | Larroche | 414/26 |
| 3,999,303 | 12/1976 | Martin et al. | 34/380 |
| 4,038,929 | 8/1977 | Sain | 414/679 X |
| 4,053,072 | 10/1977 | Ross et al. | 414/495 |
| 4,113,122 | 9/1978 | Lutz | 414/527 |
| 4,258,514 | 3/1981 | St. Clair | 52/86 |
| 4,371,305 | 2/1983 | Pannell | 198/750.1 X |
| 4,510,740 | 4/1985 | Foster | 414/26 X |
| 4,578,935 | 4/1986 | King | 60/655 |
| 4,632,626 | 12/1986 | O'Shea | 414/527 X |
| 4,663,860 | 5/1987 | Beall | 34/396 |
| 4,664,131 | 5/1987 | Moorefield, II | 131/300 |
| 4,790,334 | 12/1988 | Day, V, et al. | 131/290 |
| 4,842,471 | 6/1989 | Hodgetts | 414/527 X |
| 5,050,318 | 9/1991 | DuBruyn | 198/803.13 |
| 5,081,827 | 1/1992 | Kennedy | 414/26 X |
| 5,156,518 | 10/1992 | VanMatre | 414/527 |
| 5,306,114 | 4/1994 | Eaton | 414/498 |
| 5,311,710 | 5/1994 | Eaton | 52/174 |
| 5,360,097 | 11/1994 | Hibbs | 414/528 X |
| 5,373,861 | 12/1994 | Eaton | 131/303 |

FOREIGN PATENT DOCUMENTS

| | | | |
|---|---|---|---|
| 103695 | 4/1938 | Australia | 414/527 |
| 476869 | 8/1951 | Canada | 414/528 |
| 861327 | 1/1971 | Canada | 414/527 |
| 601578 | 8/1934 | Germany | 414/528 |
| 1030260 | 5/1958 | Germany | 414/527 |
| 74733 | 4/1987 | Japan | 414/527 |

*Primary Examiner*—David A. Bucci
*Attorney, Agent, or Firm*—Dority & Manning

[57] ABSTRACT

A self-loading tobacco trailer is provided for loading and transporting burley tobacco stalks impaled on tobacco rods. The trailer comprises a wheeled undercarriage configured to be connected to a work vehicle; a generally upright side structure running lengthwise relative to the trailer; and a tobacco rod carrying assembly also running lengthwise relative to the trailer and supported by the side structure. The tobacco rod carrying assembly may comprise oppositely faced parallel carrying members at a height such that the tobacco stalks impaled on the tobacco rods hang freely within the side structure between the carrying members. Chains guided by the carrying members transversely position the tobacco rods with respect to the carrying members. A drive mechanism is operatively connected to the chains and is configured to move them in at least one lengthwise direction with respect to the carrying members. Tobacco workers may thus manually or mechanically load the tobacco trailer at one convenient point by successively placing tobacco laden rods on the movable members as the drive mechanism moves the movable members onto the trailer at a predetermined or selective rate. Conversely, workers may similarly unload the trailer by reversing the process.

27 Claims, 1 Drawing Sheet

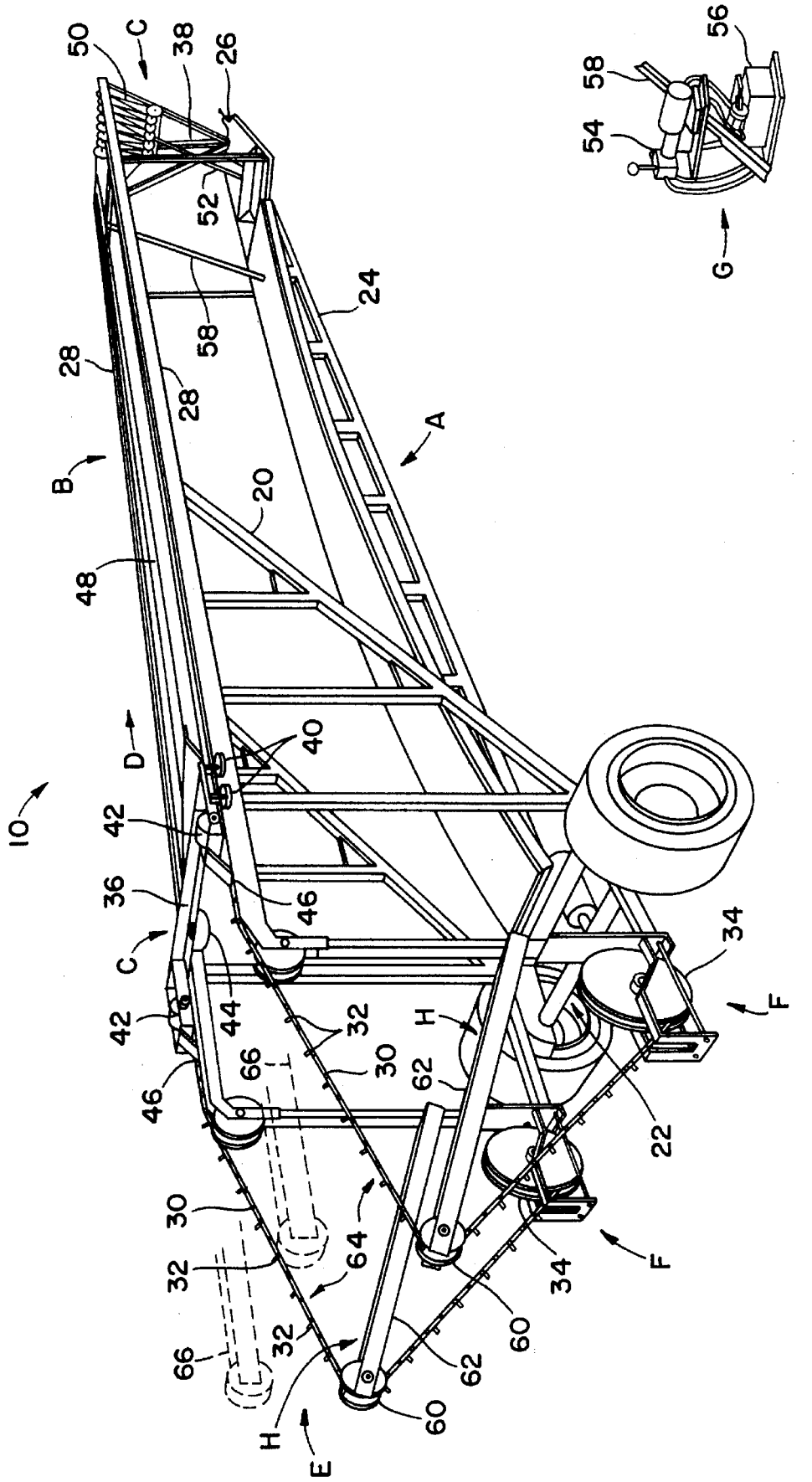

SELF-LOADING TOBACCO TRAILER

BACKGROUND OF THE INVENTION

The present invention relates to a self-loading tobacco trailer and, more particularly, an apparatus for loading cut tobacco stalks onto a trailer for transport to and from a curing cell.

Burley tobacco plants grow as relatively tall stalks with the tobacco leaves growing radially out from the stalks. When the burley tobacco plant stalks are cut down, the widest portion (bottom of the stalk) of the main stem is manually or mechanically skewered onto a wooden or steel stake which has a sharpened point affixed at one end thereto. Generally, each stake is about four feet long, and about five or six different plants are threaded onto each stake and pushed toward the intermediate portion of the stake away from the opposite free ends of the stake. In the past, the stakes would be carried to curing sheds or manually positioned on tobacco trailers for transport thereto.

The stakes would then be manually hung across beams or supports within the curing shed and packed fairly tightly therein. The stakes were usually stored in levels or tiers within the wooden curing shed, there being three or four tiers of tobacco stakes hung within any single curing shed. Such practice is a very labor intensive operation requiring many man hours and fairly dangerous work conditions. Particularly, the elevating scaffold trailer disclosed in U.S. Pat. No. 5,306,114, the disclosure of which is hereby fully incorporated by reference herein, provides an elevating tobacco trailer for automatically loading and unloading tobacco rods into and out of a curing shed, thereby avoiding the manual transfer of tobacco rods between the trailer and curing shed racks.

It is additionally desirable to alleviate such work conditions at the point of loading the trailer. It is thus desirable to provide a self-loading tobacco trailer configured such that tobacco rods may be loaded manually or mechanically thereon at a convenient height and, thereafter, propelled to a loaded position upon the trailer.

OBJECTS AND SUMMARY OF THE INVENTION

It is a principle object of the present invention to provide a self-loading tobacco trailer which permits the loading thereof mechanically or at a minimal manual effort.

A further object is to provide a self-loading tobacco trailer which permits the manual or mechanical placement of tobacco rods thereon at a height convenient for tobacco workers.

Yet another object of the present invention is to provide an apparatus for automatically positioning tobacco rods upon a tobacco trailer for subsequent transportation.

It is also an object of the present invention to provide a self-loading trailer for use in harvesting tobacco and transporting the tobacco to a curing cell, the trailer being compatible with any number of work vehicles, such as a tractor or a truck.

Additional objects and advantages of the invention will be set forth in part in the description which follows, and in part will be obvious from the description or may be learned by practice of the invention. The objects and advantages of the invention may be realized and attained by means of the instrumentalities and combinations particularly pointed out in the appended claims.

To achieve the objects and in accordance with the purpose of the invention as embodied and broadly described herein, a self-loading transportable tobacco trailer for loading and carrying tobacco impaled on tobacco rods is provided. The self-loading transportable trailer according to the present invention comprises an undercarriage configured to be connected to a work vehicle, a generally upright side structure supported by the wheeled undercarriage, and a tobacco rod carrying assembly supported by the side structure.

In one preferred embodiment, the tobacco rod carrying assembly comprises oppositely faced parallel rod carrying members, for example rails, running lengthwise relative to the trailer and supported by the side structure at a height such that the tobacco stalks impaled on the steel tobacco rods hang freely within the side structure between the carrying members. At least one movable member is supported by the trailer such that it may move in either lengthwise direction with respect to the carrying members. The movable members are configured to position and propel the tobacco carrying rods with respect to the carrying members. Such may be accomplished, for example, by tobacco rod guides attached to the movable members and configured to transversely position the tobacco carrying rods with respect thereto. A drive mechanism is operatively connected to the movable members and is configured to move them in at least one lengthwise direction with respect to the carrying members. Utilizing the above-described preferred embodiment, tobacco workers may load the tobacco trailer at one convenient point by placing tobacco laden rods at successive tobacco rod guides as the drive mechanism moves the movable members onto the trailer at a predetermined or selective rate. Alternatively, the tobacco rods may be mechanically loaded onto the self-loading tobacco trailer from a cutting and skewering machine. Conversely, workers may similarly unload the trailer by reversing the process.

In another preferred embodiment, the rod carrying assembly further comprises a retraction assembly positioned at the rear of the trailer and configured to exert a force on the movable members tending to retract the movable members toward the trailer's rear end. The retraction assembly may, for example, comprise one or more torsion spring loaded devices, for example torsion spring reels, which would exert a continuous, but not necessarily constant, force against the movable members. More specifically, the movable members may comprise a pair of chains, one chain associated with a respective carrying member, for example a rail. Each chain may coil around its respective torsion spring reel as the chain is retracted. When the chains are fully retracted around their reels the trailer is generally in an unloaded state and the reels are in a minimally loaded condition.

In such an embodiment, the drive mechanism may include a bridle trolley operably connected to the chains at their foremost points and configured to move lengthwise along the carrying members. The drive mechanism also comprises an extraction mechanism disposed on the trailer's undercarriage generally forward of the retraction mechanism and operably connected to the bridle pulley by a flexible member, for example a chain or cable. The extraction mechanism may comprise, for example, any variety of high starting torque devices configured to selectively propel the bridle trolley and connected chains forward along the carrying members in opposition to the force exerted by the torsion spring reels. Thus, when the chains are in their fully extracted position, the trailer and the torsion spring reels are in a fully loaded state.

By selectively controlling the operation of the drive mechanism, therefore, tobacco workers may manually or mechanically load the self-loading tobacco trailer from one position—in this embodiment the trailer's rear. For example, the chains may initially be in a fully retracted state, having the bridle trolley in a maximally rearward position. If tobacco rod guides are utilized, only the first few such guides would be exposed. By selectively activating the drive mechanism or by activating the drive mechanism at a constant predetermined rate, tobacco workers may stand at the rear of the trailer and continuously load the trailer from that position as the bridle trolley and chains are pulled forward along the carrying members and as successive tobacco rod guides appear. Similarly, the trailer may be mechanically loaded as tobacco rods are off-loaded from a cutting and skewering machine. When the bridle trolley reaches its forwardmost position, the trailer would be fully loaded.

It should be understood that preferred embodiments of the present invention may or may not include tobacco rod guides attached to the movable members. Depending upon the movable member construction, frictional contact between the tobacco-laden rods and the movable members may be sufficient to position the rods with respect to the movable members as the movable members are propelled along the rod carrying members.

In another preferred embodiment, the rod carrying assembly further comprises a pair of pulley assemblies disposed at the rear of the trailer and configured to convey the chains between the carrying members and the torsion spring reels. The reels are located at the rear base of the trailer near the trailer wheels. Each pulley assembly comprises a pair of bar members angularly disposed at the rear of the trailer and having a first pulley at the apex thereof and a second pulley at the joinder of the pulley assembly and the carrying member. Thus, the respective chain travels from the carrying assembly, over the second pulley to the first pulley parallel to the first bar member, and around the first pulley to the respective torsion spring reel parallel to the second bar member.

The first bar member thus comprises a convenient loading point at the rear of the trailer.

In another preferred embodiment, the movable members comprise two continuous flexible members, for example chains, associated with the respective carrying members. The drive mechanism of this embodiment comprises a pair of drive sprockets disposed on the forward ends of the carrying members and an assembly for operatively rotating the drive sprockets. Such assembly may comprise, for example, a pair of double acting cylinders attached thereto or an axle/motor configuration. It will be understood that various equivalent means of driving the drive sprockets may be utilized.

The rod carrying assembly further comprises a return mechanism disposed at respective rearward lengthwise ends of the carrying members such that the continuous chains passing along the carrying members from the drive sprockets pass over the return mechanism, for example a pair of idler sprockets, thereafter returning to the drive sprockets generally under the carrying members.

In yet another preferred embodiment, the above-described return mechanism further comprises two oppositely faced parallel loading members, each pivotally joined to an associated carrying member, having the idler sprocket attached to the opposite rearward end thereof. The loading member may thus comprise a horizontal extension of the carrying members to facilitate, for example, mechanical loading from a cutting and skewering machine but may also, for example, be disposed below the horizontal at an angle with the carrying members to provide a more convenient manual loading position for tobacco workers. In this embodiment, a second idler sprocket is disposed at the pivotal joinder between the loading member and the carrying member on which the chain may travel. Furthermore, a tension pulley system is in operative communication with each chain between the second idler sprocket and the drive sprocket to maintain a minimum desired tension on the chain as the loading member is located at various positions.

It should be understood that various embodiments or configurations of the present invention may be used either for manual or mechanical loading as needed. For example, the single pulley member as described above may be positioned to extend horizontally from the side structure to facilitate mechanical loading from, for example, a cutting and skewering machine. Such mechanical loading could largely eliminate heavy manual labor from the tobacco transporting process, particularly if an elevating trailer configuration is employed.

Still another presently preferred embodiment provides a self-loading transportable tobacco trailer having a tobacco rod carrying assembly such as, for example, the above-described examples or their equivalents, wherein the side structure comprises a frame structure raisably supported on the wheeled undercarriage. The trailer is further configured to selectively raise and lower the tobacco rod carrying members relative to the wheeled undercarriage so that the carrying members can be selectively adjusted in height relative to holding racks within a tobacco curing cell whereby the carrying members can be selectively readjusted in height relative to the holding racks so that tobacco rods can be deposited on the curing cell holding racks or transferred to the carrying members from the holding racks. A disclosure of a trailer generally employing such elevating features is provided in the above-referenced '114 patent.

It is thus contemplated to be within the scope and spirit of the present invention to provide an elevating self-loading transportable tobacco trailer that may be conveniently and efficiently loaded or unloaded in the field and that may also be automatically loaded or unloaded in a curing shed. For example, a tobacco worker may efficiently load the trailer with tobacco laden rods manually or mechanically onto a tobacco rod carrying assembly as described above, after which a single worker may transport the trailer to a curing shed and deposit the tobacco rods in a curing cell therein as generally described in the '114 patent.

The accompanying drawings, which are incorporated in and constitute a part of the specification, illustrate one embodiment of the invention, and together with the description serve to explain the principles of the invention.

BRIEF DISCUSSION OF THE DRAWINGS

A full and enabling disclosure of the present invention, including the best mode thereof, directed to one of ordinary skill in the art, is set forth in the remainder of the specification, which makes reference to the appended figures in which:

FIG. 1a is a perspective view of a preferred embodiment of the self-loading tobacco trailer according to the present invention; and FIG. 1b is a perspective view of a powering means compatible with the trailer as in FIG. 1a.

Repeat use of reference characters in the following specification and appended drawing is intended to represent the same or analogous features, elements, or steps of the present invention.

BRIEF DESCRIPTION OF PREFERRED EMBODIMENTS

Reference will now be made in detail to the presently preferred embodiments of the invention, one or more examples of which are illustrated in the drawing. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents.

Referring to FIG 1a, a self-loading trailer for receiving tobacco laden rods is depicted generally as numeral 10. Trailer 10 comprises wheeled undercarriage A, generally upright side structure 20 supported by wheeled undercarriage A and running lengthwise relative to trailer 10, and tobacco rod carrying assembly B running lengthwise relative to trailer 10 and supported by side structure 20. Wheeled undercarriage A generally comprises wheeled base 22, lower frame 24, and hitching device 26 for hitching trailer 10 to a work vehicle. Trailer 10 may be pushed or pulled by the work vehicle. Any conventional hitch may be employed as hitching device 26.

Rod carrying assembly B comprises oppositely faced parallel rod carrying members 28 running lengthwise relative to trailer 10 and supported by side structure 20 at a height such that tobacco stalks impaled on tobacco rods disposed on rod carrying members 28 hang freely within the structure between the carrying members. Rod carrying assembly B also includes movable members, for example chains 30, configured to travel along carrying members 28 in channels at the tops thereof such that chains 30 may move in either lengthwise direction along carrying members 28. A plurality of tobacco rod guides 32 are affixed to chains 30 at predetermined intervals. Rod guides 32 are positioned on respective chains 32 such that tobacco carrying rods may be transversely positioned on chains 30 at the predetermined intervals. When loaded, the rods will be accordingly positioned at such intervals along carrying members 28.

As described in the Summary of the Invention, an alternative embodiment of the invention utilizes movable members without tobacco rod guides. Applicant has found that tobacco-laden rods may be secured on the movable members because of their weight. Such a configuration may permit more efficient winding of the movable members onto the torsion reels.

Rod carrying assembly B also includes a drive mechanism, generally indicated at C, in communication with chains 30. Drive mechanism C is configured to move chains 30 in the forward direction indicated at D lengthwise along carrying members 28 such that tobacco laden rods placed on chains 30 at rod guides 32 as described above are loaded onto trailer 10.

Accordingly, tobacco laden rods may be manually or mechanically loaded onto trailer 10 at a single point, for example at the rearward end area indicated generally at E.

Rod carrying assembly B further comprises a retraction assembly, indicated generally at F, positioned at the rear end of trailer 10 and configured to exert a force on chains 30 tending to pull them to the rear of trailer 10. Retraction assembly F comprises one or two torsion spring loaded devices, such as reels 34, configured to windingly collect their associated chains 30 as the associated chains are rearwardly retracted. Thus, torsion spring reels 34 constantly exert a force upon chains 30. It should be understood by those of ordinary skill in the art that torsion spring reels 34 will be minimally loaded when chains 30 are maximally retracted and maximally loaded when chains 30 are maximally extracted. Chains 30 will be maximally retracted when maximally wound on torsion spring reels 34 and maximally extracted when pulled to the forwardmost possible positions on carrying members 28.

Drive mechanism C is configured to selectively exert a force on chains 30 opposing the force exerted thereon by torsion spring reels 34. Accordingly, drive mechanism C may selectively pull chains 30 forwardly onto carrying members 28.

Drive mechanism C here comprises a bridle trolley 36 and an extraction mechanism 38. Bridle trolley 36 is configured to move lengthwise along carrying members 28 via rollers 40, 42, and 44 traveling on and guided by carrying members 28 as shown. Bridle trolley 36 is operably connected to chains 30 at forward points of chains at 46.

Extraction mechanism 38 is disposed on undercarriage A generally forward of retraction mechanism F as shown. It is operably connected to bridle trolley 36 by a flexible member, for example cable 48. Extraction mechanism 38 preferably has a high starting torque to overcome initial resistance. Extraction mechanism 38 here comprises a pulley system 50 and hydraulic cylinder 52. Chains 30 are shown in FIG. 1a in a retracted position. As loading begins, an operator may activate extraction device 38, causing hydraulic cylinder 52 to retract, thereby opening pulley system 50 and, consequently, propelling bridle trolley 36 forward along carrying members 28. The operation of such a pulley extraction device is well understood and need not be explained in great detail herein.

It should be understood by those of ordinary skill in the art that various configurations of extraction mechanism 38 may be achieved. For example, a double acting cylinder configuration may drive flexible member 48 over drive sprockets braked by pawls located in the hubs thereof. Extraction mechanism 38 may also comprise a winch and pulley or gear mechanism. More generally, any conventional means for selectively and controllably propelling, for example pushing or pulling, and repelling, extracting and releasing, or extracting and retracting, chains 30 may be employed as extraction mechanism 38 and/or retraction assembly F. Additionally, while extraction mechanism 38 and retraction assembly F are depicted as separate devices, it should be understood that they may be integrated within a single unit.

Furthermore, various means of powering drive mechanism 38 are included within the scope of the invention. For example, in one preferred embodiment as shown in FIG. 1b, a powering means, indicated generally at G, comprises control station 54 and power supply 56. Powering means G may be located on trailer 10 or, for example, comprise a part of the work vehicle employed to transport trailer 10. For example, many farm tractors include their own hydraulic system. Powering means G may comprise a simple connection to the hydraulic system of a tractor, whereby hydraulic cylinder 52 is actuated by the tractor's hydraulic system.

In FIG. 1a, power supply 56 comprises a battery for driving an electric motor controlled by control station 54. The electric motor drives a hydraulic pump to operate hydraulic cylinder 52. As described above, powering means G may be mounted in various locations, for example attached to frame member 58 as in FIGS. 1a and 1b. As should be understood by those of ordinary skill in the art, a wheel-driven generator may be utilized to recharge a battery employed as power supply 56. Additionally, such a wheel-driven mechanism may comprise an extraction mechanism to pull bridle trolley 36.

It should be understood that various braking mechanisms may be employed with powering means G and hydraulic cylinder 52, for example clutch and valve assemblies within powering means G and controlled by control station 54.

Accordingly, extraction mechanism 38 is configured to selectively pull bridle trolley 36 in a forward direction on carrying members 28. For example, if trailer 10 is transported to a location for loading, an operator may retract chains 30 to their fully retracted positions such that bridle trolley 36 is most rearwardly located. As tobacco laden rods are placed across chains 30 at tobacco rod guides 32, the operator may selectively activate hydraulic cylinder 52 to open pulley system 50, thereby pulling bridle trolley 36 and chains 30 forwardly along carrying members 28. Thus, tobacco laden rods may be successively placed on chains 30 for loading onto trailer 10.

In this embodiment, rod carrying assembly B at rearward end E of trailer 10 is configured to facilitate the loading of tobacco rods on trailer 10. As shown in FIG. 1a, pulley assemblies H, comprising pulleys 60 and pulley members 62, extend rearwardly from side structure 20 to engage and convey respective chains 30 between their associated torsion spring reels 34 and carrying members 28. The angle of pulley members 62 with respect to side structure 20 defines loading areas 64 of chains 30. It should be understood that various such constructions are possible, including, for example, horizontal extensions as indicated in phantom at 66 to facilitate, for example, mechanical loading from a cutting and skewering machine.

It should furthermore be understood that pulley assemblies H may comprise various equivalent constructions. For example, pulleys 60 may comprise sprockets or other equivalent devices. All such configurations are within the scope and spirit of the present invention.

As discussed above in the Summary of the Invention, various embodiments of the present invention are understood to be within the scope thereof. Accordingly, tobacco rod carrying assembly B may comprise a continuous chain construction operably disposed on drive mechanism B and a return mechanism disposed at rearward end E of trailer 10. Thus, no torsion spring wheels are required and the carrying members define drive paths for the continuous chains.

In such preferred embodiments, drive mechanism C comprises two drive sprockets, each operably connected to an associated chain, and two double acting cylinder assemblies, each operatively connected to, and configured to selectively turn, an associated drive sprocket. Thus, by controlling the double acting cylinder assemblies through powering means G, the continuous chains may be driven about the return mechanism and drive mechanism.

Various drive mechanisms may be employed to drive such constructions. For example, a motor may be operably connected to an axle between the drive sprockets by a universal gear.

The return mechanism may comprise pulley assemblies comprising two oppositely faced parallel loading members, each pivotally joined to an associated continuous chain and configured to guide the chain. Each loading member is pivotally joined at the rearward end of the carrying members and extends rearwardly of the trailer. Each loading member has an idler sprocket at each end thereof, one at the pivotal joinder between the loading members and its associated carrying member and one at the rearmost end. Thus, the continuous chain passes from the carrying member over the first idler sprocket, along the loading member, and around the second idler sprocket to return to the drive mechanism generally beneath the carrying members and through or beneath the side structure and/or the undercarriage. A raising and lowering device may be operatively connected to each of, or both of, the loading members and configured to selectively and pivotally position the loading members at a desired angle below the carrying members to permit the loading of the tobacco rods thereon. Such raising and lowering device may comprise, for example, a hydraulic piston arrangement.

The return mechanism may also comprise two tension pulley systems, each in operative communication with an associated continuous chain and positioned between an associated second idler sprocket and the drive mechanism and configured to maintain at least a minimum desired tension in the chain. Thus, a minimum tension is maintained in the continuous chains as the loading members are raised or lowered to desired positions.

It should also be understood that the embodiments discussed above may be utilized with an elevating scaffold trailer such as is disclosed in the '114 patent referenced above. That is, the side structure of trailer 10 may comprise a frame structure raisably supported on the wheeled undercarriage. In such an embodiment, trailer 10 further comprises an elevating mechanism configured to selectively raise and lower the tobacco rod carrying members relative to the wheeled undercarriage. The elevating mechanism is operatively connected to the frame structure and the wheeled undercarriage such that the carrying members can be selectively adjusted in height relative to holding racks within a tobacco curing cell. The carrying members may then be selectively readjusted in height relative to the holding racks so that tobacco rods, approximately five to six feet in length, can be deposited upon the curing cell holding racks or transferred to the carrying members from the holding racks.

It will be apparent to those skilled in the art that various modifications and variations can be made in the apparatus and method of the present invention without departing from the scope or spirit of the invention. For example, the frame structure of the invention can comprise virtually any configuration or arrangement of support elements. Thus, it is intended that the present invention cover the modifications and variations of this invention provided they come within the scope of the appended claims and their equivalents.

What is claimed is:

1. A self-loading transportable tobacco trailer for transporting tobacco laden tobacco rods, said trailer comprising:
   a wheeled undercarriage configured to be connected to a work vehicle;
   a generally upright side structure supported by said wheeled undercarriage; and
   a tobacco rod carrying assembly supported by said side structure, said rod carrying assembly comprising,
      oppositely faced parallel rod carrying members supported by said side structure at a height such that tobacco stalks impaled on the tobacco rods hang freely within said structure between said carrying members,
      at least one movable member supported by the trailer and configured to move in either lengthwise direction with respect to said carrying members and to position and propel the tobacco carrying rods with respect to said carrying members, a drive mechanism in communication with, and configured to move, said at least one movable member in at least one lengthwise direction along said carrying members to permit at least one of the placement and removal of the tobacco rods at said at least one movable member and to permit the loading of the trailer with tobacco rods at a single loading point; and wherein said tobacco rod carrying assembly further comprises tobacco rod guides affixed to said at least one movable member and configured to transversely position the tobacco carrying rods at predetermined intervals with respect to said carrying members.

2. The self-loading transportable tobacco trailer as in claim 1, wherein said rod carrying assembly further comprises a retraction assembly configured to exert a force on said at least one movable member tending to move said at least one movable member toward said retraction mechanism, and wherein said drive mechanism is further configured to selectively exert a force on said at least one movable member opposing the force exerted thereon by said retraction assembly so as to position said at least one movable member with respect to said carrying members.

3. The self-loading transportable tobacco trailer as in claim 2, wherein said retraction assembly comprises at least one torsion spring loaded device.

4. The self-loading transportable tobacco trailer as in claim 3, wherein said at least one torsion spring loaded device is configured to be minimally loaded when said at least one movable member is maximally retracted to a rearmost orientation relative to the trailer and to be maximally loaded when said at least one movable member is maximally extracted to a forwardmost orientation.

5. The self-loading transportable tobacco trailer as in claim 1, wherein said at least one movable member comprises chains associated with respective rod carrying members.

6. The self-loading transportable tobacco trailer as in claim 2, wherein said at least one movable member further includes a chain associated with each said respective rod carrying member, and said retraction assembly comprises a torsion spring loaded device respectively associated with each said chain.

7. The self-loading transportable tobacco trailer as in claim 6, wherein each said torsion spring loaded device is configured to windingly collect its associated chain as said associated chain is rearwardly retracted.

8. The self-loading transportable tobacco trailer as in claim 1, wherein said drive mechanism comprises a bridle trolley operably connected to said at least one movable member and configured to move lengthwise along said carrying members.

9. The self-loading transportable tobacco trailer as in claim 8, wherein said bridle trolley is further configured to move along said carrying members via rollers travelling on and guided by said carrying members.

10. The self-loading transportable tobacco trailer as in claim 1, wherein said drive mechanism comprises an extraction mechanism operably connected to said at least one movable member and configured to selectively propel said at least one movable member in a forward direction along said carrying members.

11. The self-loading transportable tobacco trailer as in claim 10, wherein said extraction mechanism further comprises a braking mechanism configured to selectively impede rearward retraction of said at least one movable member.

12. The self-loading transportable trailer as in claim 6, wherein each said torsion spring loaded device is disposed at a rearward base of said side structures, said rod carrying assembly further comprising a pulley assembly respectively associated with each said chain and disposed at the rear of said side structure and said undercarriage, each said pulley assembly configured to convey a respective said chain between an associated torsion spring loaded device and an associated said carrying member and disposed to permit loading of the tobacco laden rods thereon.

13. A self-loading transportable tobacco trailer for transporting tobacco laden rods, said trailer comprising:

an undercarriage configured to be connected to a work vehicle;

a generally upright side structure supported by said undercarriage; and a tobacco rod carrying assembly supported by said side structure, said rod carrying assembly comprising,
  oppositely faced parallel rod carrying members supported by said side structure at a height such that tobacco stalks impaled on the tobacco rods hang freely within said structure between said carrying members,
  at least one movable member supported by the trailer and configured to move in either lengthwise direction with respect to said carrying members and to position and propel the tobacco carrying rods with respect to said carrying members,
  a retraction assembly configured to exert a force on said at least one movable member tending to move said at least one movable member toward said retraction mechanism, and
  a drive mechanism in communication with, and configured to selectively move, said at least one movable member in at least one lengthwise direction along said carrying members to permit at least one of the placement and removal of the tobacco rods at said at least one movable member and to permit the loading of the trailer with tobacco rods at a single loading point,
    wherein said drive mechanism is further configured to selectively exert a force on said at least one movable member opposing the force exerted thereon by said retraction assembly so to position said at least one movable member with respect to said carrying members.

14. The self-loading transportable tobacco trailer as in claim 13, wherein said tobacco rod carrying assembly further comprises tobacco rod guides affixed to said at least one movable member and configured to transversely position the tobacco carrying rods at predetermined intervals with respect to said carrying members.

15. The self-loading transportable tobacco trailer as in claim 13, wherein said retraction assembly comprises at least one torsion spring loaded device configured to be minimally loaded when said at least one movable member is maximally retracted to a rearmost orientation relative to the trailer and to be maximally loaded when said at least one movable member is maximally extracted to a forwardmost orientation.

16. The self-loading transportable tobacco trailer as in claim 15, wherein said at least one movable member further includes a chain associated with each said respective rod carrying member, wherein said retraction assembly comprises a said torsion spring loaded device respectively associated with each said chain, each said torsion spring loaded device configured to windingly collect its associated chain as said associated chain is rearwardly retracted, and wherein said drive mechanism comprises, a bridle trolley configured to move lengthwise along said carrying members via rollers travelling on and guided by said carrying members and operably connected to said chains at forward points of said chains, and an extraction mechanism disposed on said undercarriage generally forward of said retraction mechanism and operably connected to said bridle pulley by a flexible member, and configured to selectively pull said bridle trolley in a forward direction along said carrying members.

17. The self-loading transportable tobacco trailer as in claim 16, wherein said extraction mechanism further comprises a braking mechanism configured to selectively impede rearward retraction of said chains.

18. The self-loading transportable tobacco trailer as in claim 16, wherein each said torsion spring loaded device is disposed at a rearward base of said side structures, said rod carrying assembly further comprising a pulley assembly respectively associated with each said chain and disposed at the rear of said side structure and said undercarriage, each said pulley assembly configured to convey a respective said chain between an associated torsion spring loaded wheel and an associated said carrying member and disposed to permit loading of the tobacco laden rods thereon.

19. A tobacco rod carrying assembly for carrying tobacco laden tobacco rods on an associated self-loading tobacco trailer, said assembly comprising:

oppositely faced parallel rod carrying members configured to be supported by the trailer at a height such that tobacco stalks impaled on the tobacco rods hang freely within the trailer between said carrying members;

at least one movable member configured to be supported by the trailer and to move in either lengthwise direction with respect to the carrying members and to position and propel the tobacco carrying rods with respect to said carrying members;

a drive mechanism in communication with, and configured to move, said at least one movable member in at least one lengthwise direction along said carrying members to permit at least one of the placement and removal of the tobacco rods at said at least one movable member and to permit the loading of the trailer with tobacco rods at a single loading point; and tobacco rod guides affixed to said at least one movable member and configured to transversely position the tobacco carrying rods at predetermined intervals with respect to said carrying members.

20. The assembly as in claim 19, wherein said rod carrying assembly further comprises a retraction assembly configured to exert a force on said at least one movable member tending to move said at least one movable member toward said retraction assembly, and wherein said drive mechanism is further configured to selectively exert a force on said at least one movable member opposing the force exerted thereon by said retraction assembly so to position said at least one movable member with respect to said carrying members.

21. The assembly as in claim 20 in said retraction assembly comprises at least one torsion spring loaded device configured to be minimally loaded when said at least one movable member is maximally retracted to a rearmost orientation relative to the trailer and to be maximally loaded when said at least one movable member is maximally extracted to a forwardmost orientation.

22. The assembly as in claim 19, wherein said at least one movable member comprises a chain associated with each respective rod carrying member.

23. The assembly as in claim 20, wherein said at least one movable member comprises a chain associated with each respective rod carrying member, and said retraction assembly comprises a torsion spring loaded device respectively associated with each said chain, each said torsion spring loaded device configured to windingly collect its associated chain as said associated chain is rearwardly retracted.

24. The assembly as in claim 19, wherein said drive mechanism comprises a bridle trolley operably connected to said at least one movable member and configured to move lengthwise along said carrying members.

25. The assembly as in claim 24, wherein said bridle trolley is configured to move along said carrying members via rollers travelling on and guided by said carrying members.

26. The assembly as in claim 19, wherein said drive mechanism comprises an extraction mechanism operably connected to said at least one movable member and configured to selectively propel said at least one movable member in a forward direction along said carrying members.

27. The assembly as in claim 23, wherein each said torsion spring loaded device is disposed at a rearward base of the trailer, said rod carrying assembly further comprising a pulley assembly respectively associated with each said chain and disposed at the rear of the trailer, each said pulley assembly configured to convey a respective said chain between an associated torsion spring loaded device and an associated said carrying member and disposed to permit loading of the tobacco laden rods thereon.

* * * * *